G. D. COLEMAN.
MACHINE FOR STUDDING PILES.
APPLICATION FILED APR. 12, 1905.
995,118.
Patented June 13, 1911.
6 SHEETS—SHEET 3.
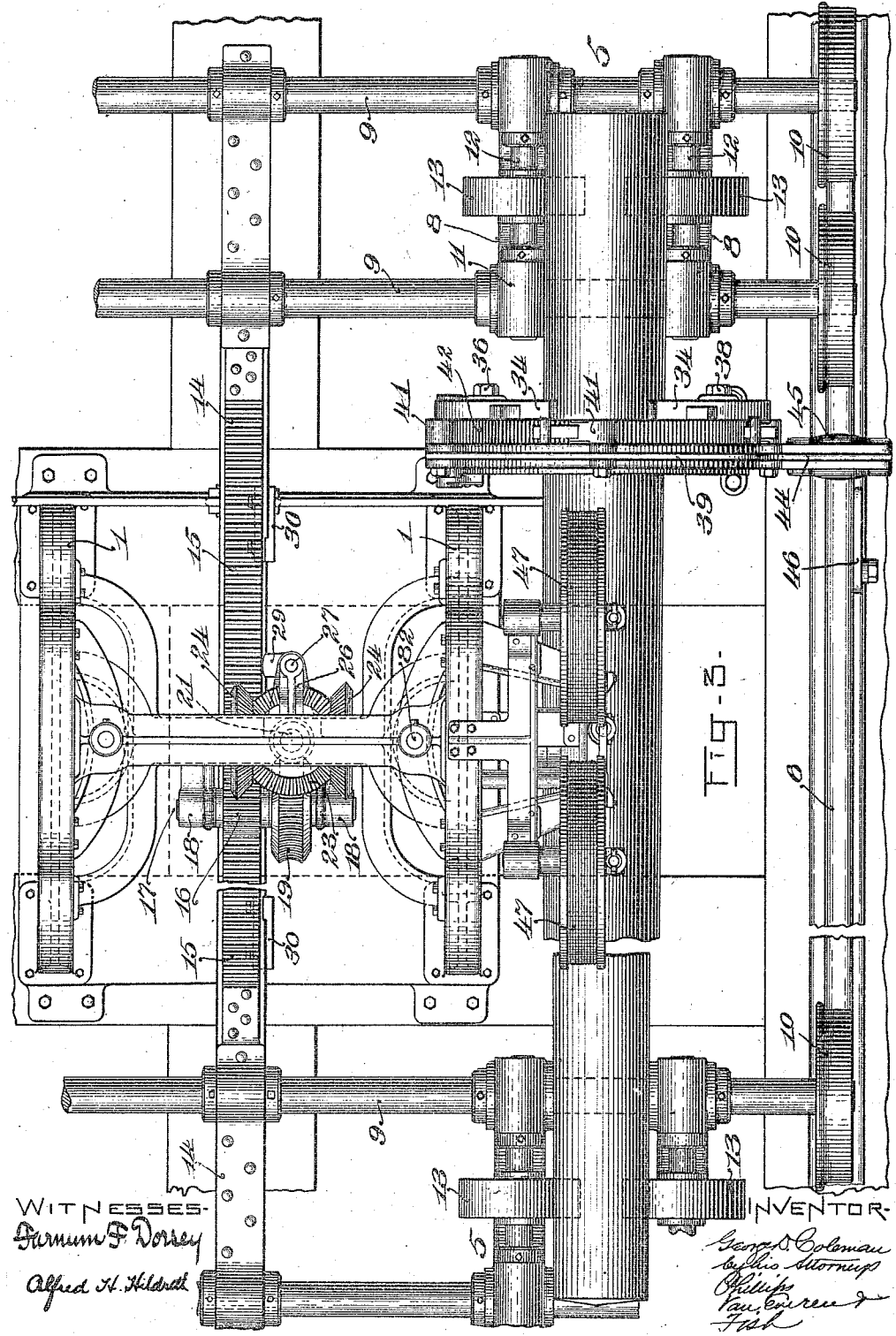

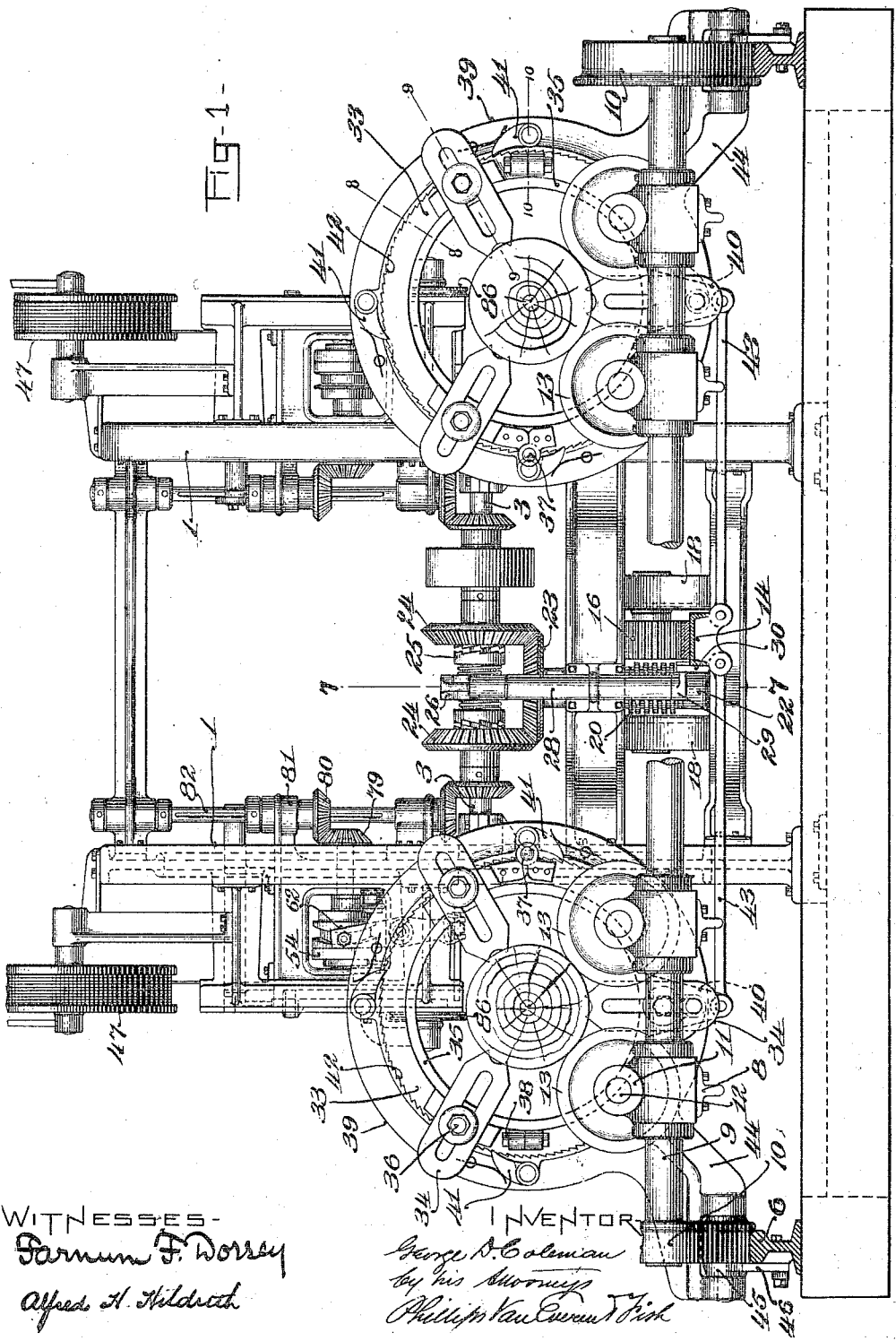

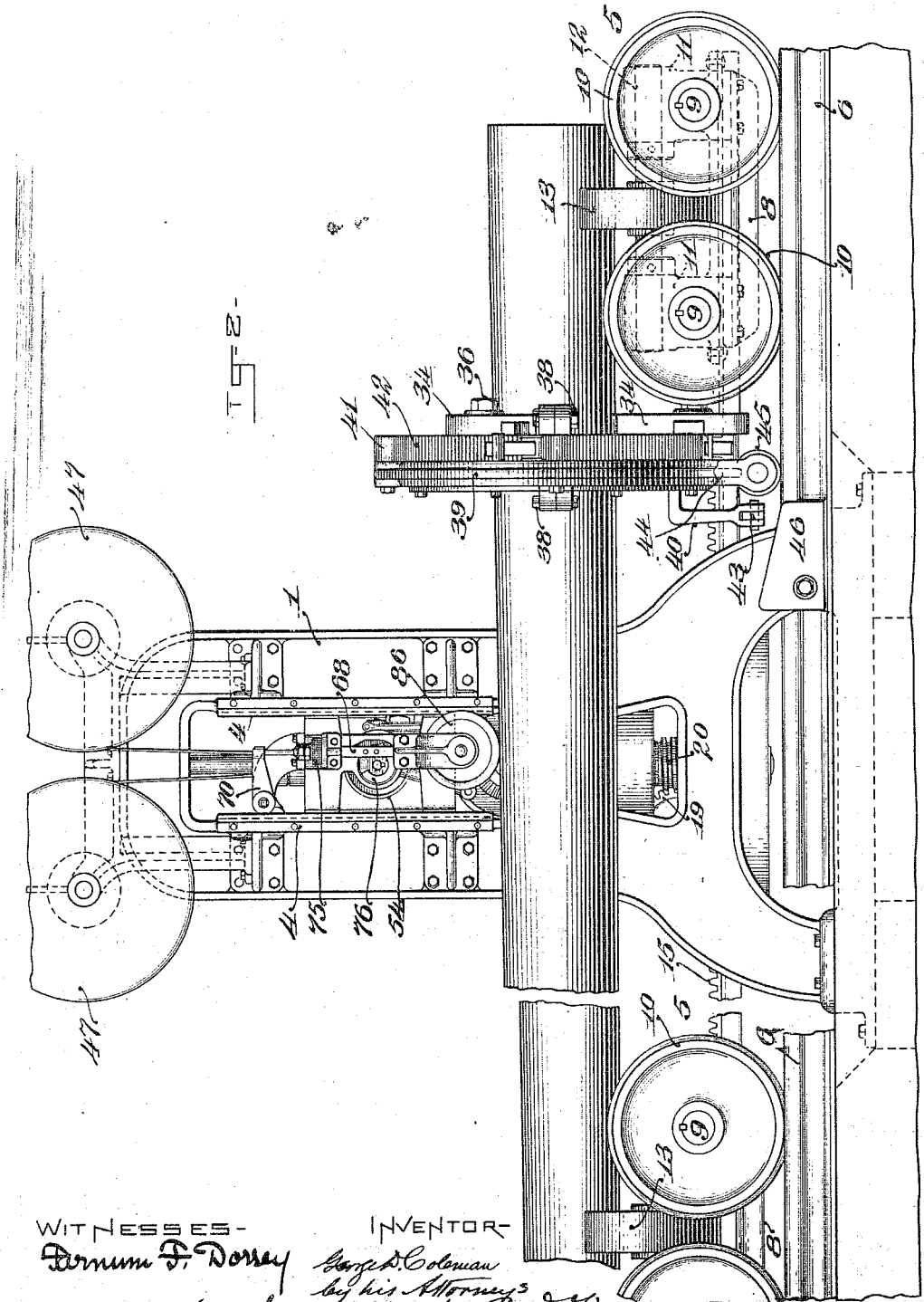

G. D. COLEMAN.
MACHINE FOR STUDDING PILES.
APPLICATION FILED APR. 12, 1905.
995,118.
Patented June 13, 1911.
6 SHEETS—SHEET 4.
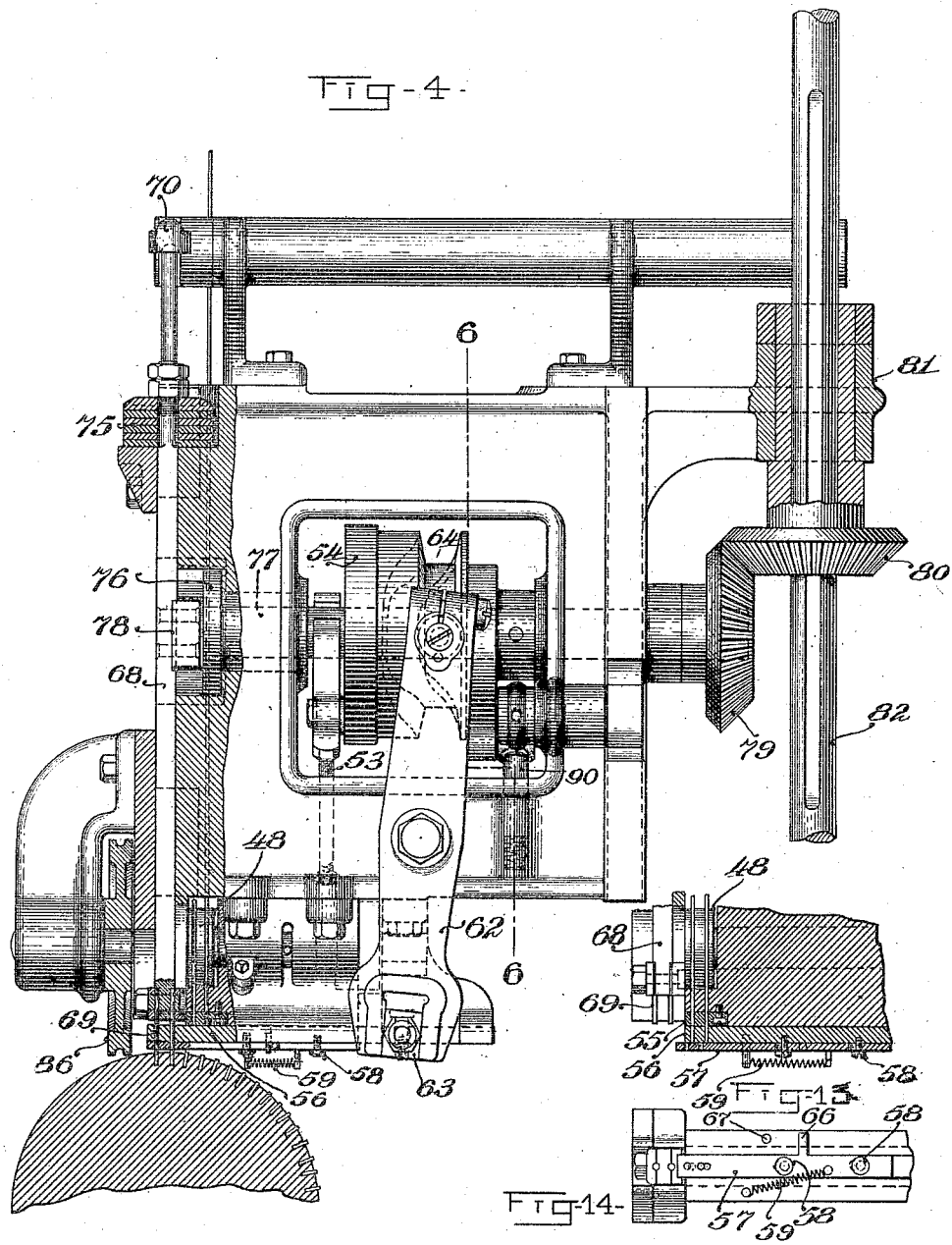

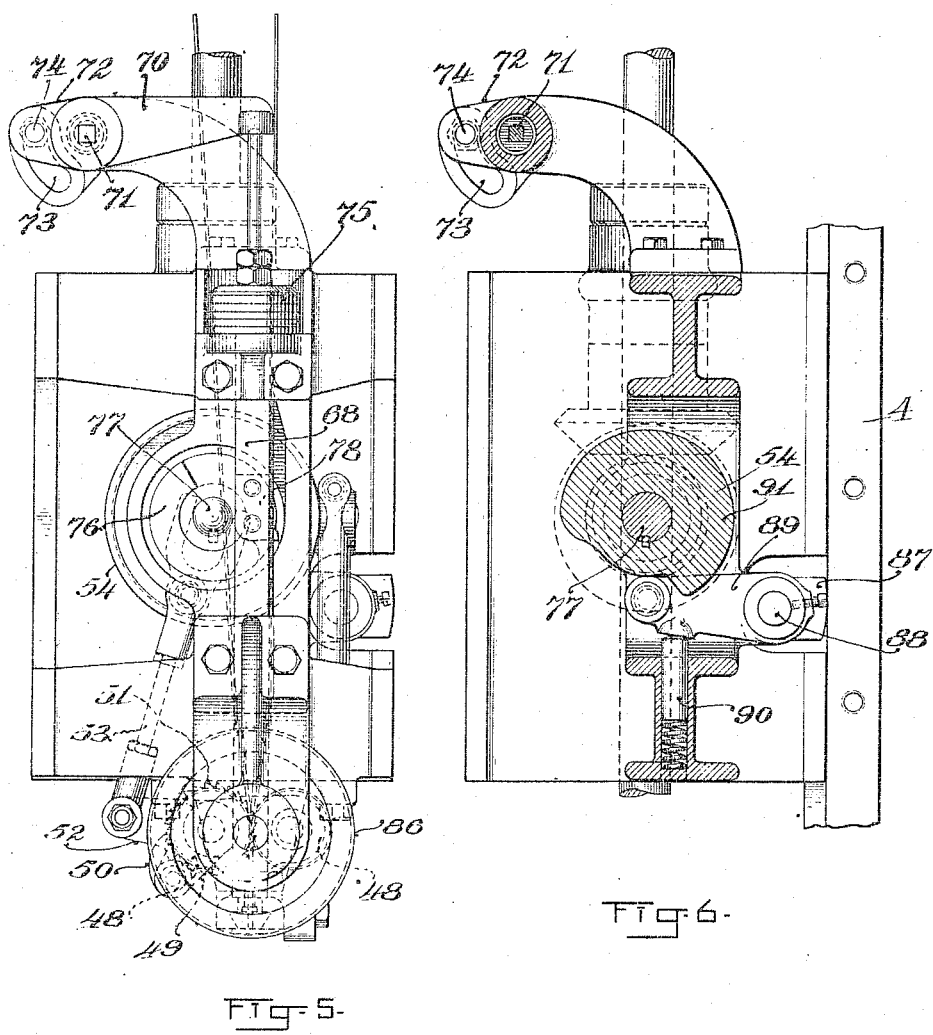

G. D. COLEMAN.
MACHINE FOR STUDDING PILES.
APPLICATION FILED APR. 12, 1905.
995,118.
Patented June 13, 1911
6 SHEETS—SHEET 6.
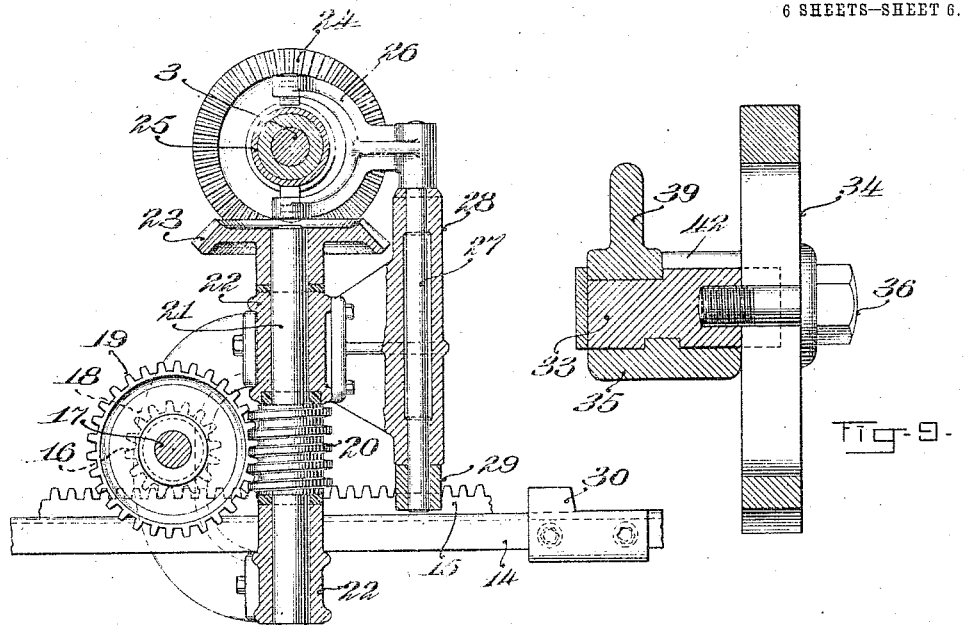
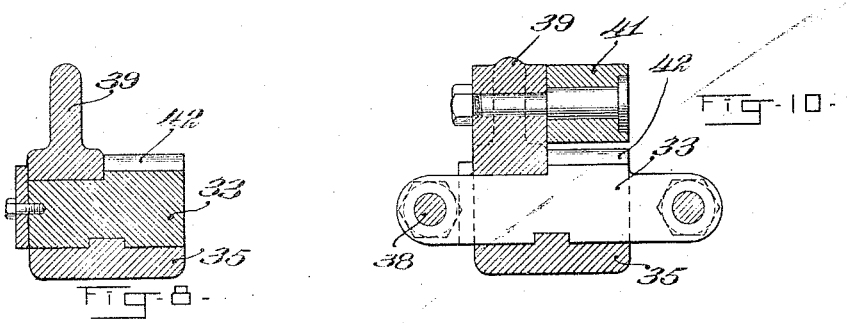
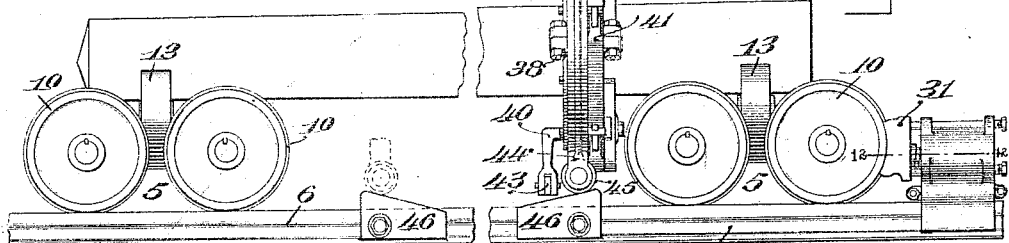
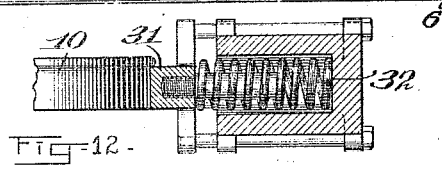

UNITED STATES PATENT OFFICE.

GEORGE D. COLEMAN, OF BROOKLINE, MASSACHUSETTS, ASSIGNOR TO COLEMAN LIQUID COPPER COMPANY, OF JERSEY CITY, NEW JERSEY, A CORPORATION OF NEW JERSEY.

MACHINE FOR STUDDING PILES.

995,118.     Specification of Letters Patent.     Patented June 13, 1911.

Application filed April 12, 1905. Serial No. 255,187.

*To all whom it may concern:*

Be it known that I, GEORGE D. COLEMAN, a citizen of the United States, residing at Brookline, in the county of Norfolk and State of Massachusetts, have invented certain new and useful Improvements in Machines for Studding Piles; and I do hereby declare the following to be a full, clear, and exact description of the invention, such as will enable others skilled in the art to which it appertains to make and use the same.

The present invention relates to a machine for studding piles.

The object of the invention is to produce a machine for studding piles with pieces of metal such as copper or some alloy of copper, so that the piles, when exposed to water, will be protected from the action of destructive marine organisms, such as teredoes, by the corrosive salts produced by the action of the water upon the copper.

To the above end the present invention consists in the machine for studding piles hereinafter described and particularly defined in the claims.

In the drawings, Figure 1 is an end elevation of a machine embodying the present invention; Fig. 2 is a side elevation; Fig. 3 is a plan view; Fig. 4 is a side elevation of the stud-driving mechanism shown partly in cross-section; Fig. 5 is an enlarged detail from Fig. 2 showing the stud-driving mechanism; Fig. 6 is a section on the line 6—6 of Fig. 4; Fig. 7 is a section on the line 7—7 of Fig. 1; Fig. 8 is a section on the line 8—8 of Fig. 1; Fig. 9 is a section on the line 9—9 of Fig. 1; Fig. 10 is a section on the line 10—10 of Fig. 1; Fig. 11 is a side elevation omitting the stud-driving mechanism; Fig. 12 is a section on the line 12—12 of Fig. 11; Fig. 13 is an enlarged detail of Fig. 4; and Fig. 14 is a bottom view of the wire-cutting and carrying devices.

The machine of the drawings is a double machine, adapted to operate on two piles at once. The stud-driving mechanisms are supported upon the piles so as to remain always in proper operative relation thereto, and after each operation of the stud-driving mechanisms the piles are fed longitudinally a short distance, the stud-driving mechanisms remaining stationary, so as to present a new surface for the insertion of studs. When the piles, by this intermittent longitudinal movement, have moved as far as it is desired to stud them they are rotated slightly and then fed intermittently in the reverse direction.

The means for carrying the piles comprise two trucks 5 supported on wheels running on rails 6 mounted on a suitable foundation. The rails are located on opposite sides of a frame 1 in which the stud-driving mechanisms are mounted. The trucks 5 have frames 8 provided with bearings for the axles 9 of wheels 10 upon which the trucks are supported. The piles are carried by supporting rollers 13 mounted on shafts 12 journaled in bearings 11 on the trucks. The two trucks are connected together by a reach 14.

The longitudinal feeding of the piles is accomplished by the following mechanism: A rack 15 is secured to the reach 14, and the rack is engaged by a pinion 16 by which the trucks are actuated. Reversing gearing is provided for rotating the actuating pinion 16 first in one direction and then in the other. The pinion 16 is fixed to a shaft 17 mounted in bearings 18 and carrying a worm gear 19 which meshes with a worm 20 fixed to a shaft 21 carried in bearings 22. The upper end of the shaft 21 is provided with a bevel gear 23 which meshes with bevel gears 24 loosely mounted upon the main shaft 3 of the machine. The bevel gears 24 are provided with clutch faces, and between the gears is slidingly mounted upon the main shaft 3 a clutch member 25, provided with opposite faces adapted to engage the clutch faces of the two gears 24 alternatively, the clutch member being splined to the main shaft 3 so that it may be used to drive either of the gears 24. When the clutch member 25 is in engagement with one gear the trucks will be moved in one direction, and when it is in engagement with the other gear the trucks will be moved in the opposite direction. Means are provided for automatically shifting the clutch member 25 at the end of each longitudinal movement of the trucks. A yoke 26 is provided with pins which engage a groove in the clutch member 25 so that the clutch member may be moved longitudinally by the yoke. The yoke is mounted upon a rock shaft 27 supported in bearings 28 and provided at its lower end with a dog 29 adapted to engage corresponding dogs mounted upon the reach 14. At the end of a movement of the trucks in one direction one of the dogs 30 will strike the dog 29 on the rock shaft 27 and throw the clutch member 25 out of engagement with one of the bevel gears 24 and into engagement with the other. In order to facilitate the reversal of the longitudinal movement of the trucks means are provided for checking the trucks at the end of each reciprocation and for starting them in the opposite direction. These means comprise buffers 31 which engage the treads of the foremost wheels of the trucks and compress the springs 32 behind them so that the springs, after the clutch member 25 is reversed as above described, will start the truck upon its return reciprocation. These buffers also serve as brakes to stop the trucks at the correct position.

The means for rotating the piles and for holding them against accidental rotation comprise holding rings 33, one of which is mounted upon each pile, and means for rotating these rings and for holding them in their adjusted positions. The holding rings 33 are passed over the ends of the piles when the piles are placed upon the machine, and each ring is provided with dogs 34 for engaging the pile and fixing the ring thereto. The dogs are arranged to slide radially on the rings and are fixed in engagement with the piles by screws 36.

The means for holding the holding rings 33 and the piles against accidental rotation comprise friction rings 35 fitting closely the interior surfaces of the holding rings. The holding rings are divided into two portions hinged together at 37 and adjusted by bolts 38 so that the friction between the friction rings and the holding rings may be adjusted. The friction rings are provided with arms 40 connected by means of pivoted links 43 with the reach 14. By these means the holding rings and the piles are prevented from accidental rotation such as might occur if the pile were crooked so as not to balance properly upon the supporting rollers.

The means for turning the piles comprise pawl rings 39 journaled upon the holding rings 33 and provided with pawls 41 engaging ratchet teeth 42 formed upon the peripheries of the holding rings. Each pawl ring 39 is provided with an arm 44 in the end of which is journaled a roller 45. Wedge blocks 46 are secured to the rails 6 in position to engage the rollers 45 at each termination of a longitudinal reciprocation of the pile and to raise the rollers 45 and the arms 44, thereby turning the pawl rings 39 to a slight extent and with them the holding rings and the piles. By these means the piles are rotated a fraction of a revolution after each reciprocation is completed so as to cause the starting mechanism to engage a fresh surface on the pile and insert another row of studs parallel to the row last inserted.

Any suitable stud-driving mechanisms may be employed in connection with the pile carrying means. In the illustrated machine the stud-driving means comprise wire-feeding, cutting and driving mechanisms. The wire is supported upon spools 47 and passed downward between feeding rolls 48. The feeding-rolls are provided with corrugations for engaging the wire, and are intermittently rotated by a ratchet-and-pawl mechanism consisting of a pawl-carrying arm 49 pivotally mounted on the shaft of one of the feed rolls 48 and carrying at its end a pawl 50 engaging a ratchet wheel 51 secured to the feed roll, the pawl-carrying arm being oscillated by a bell-crank lever 52 pivotally connected with a pitman 53 actuated by a cam path in a cam disk 54. The wire is fed down through holes in a stationary cutting blade 55 into holes in a movable cutting blade 56 and against a cover plate 57 provided with two holes which, during the feeding movement of the feed rolls, are out of register with the holes in the movable cutter blade 56, so that the wire will be arrested by contact with the cover plate. The cover plate is slidingly secured to the lower side of the movable cutter blade by means of screws 58 which pass through slots in the cover plate. A spring 59 is secured at one end to the cover plate 57 and at the other end to the guide-way for the movable cutter blade. This spring tends to hold the cover plate in the position illustrated in Fig. 13, with the holes in the cover plate out of register with the holes in the movable cutter blade. The means for actuating the movable cutter blade comprise a lever 62 pivotally supported upon the frame of the stud-driving mechanism and provided at its lower end with a slot which is engaged by a block 63 pivotally mounted on the movable cutter blade. The upper end of the lever 62 carries a cam roll which engages a cam groove 64 in the cam disk 54. The cam groove is formed to impart to the movable cutter blade a movement to the left from the position shown in Fig. 13 after the wires have been fed by the feeding rolls 48 into the holes in the blade. The first effect of the movement of the movable cutter blade in this direction is to sever the short lengths of wire which have been fed down into the holes, then a projection 66 on the cover plate 57, coming in contact with a stop 67 secured in the guide-way for the movable cutter blade, arrests the forward movement of the cover plate in unison with the forward movement of the movable cutter blade 56, and holds the cover plate stationary, while the movable cutter blade moves forward until the holes therein, which are occupied by the studs which have been cut from the wires, are brought into alinement with the holes in the cover plate, whereupon the stud-driving hammer 68 descends, and the two stud-drivers 69 carried by the hammer enter the holes in the movable cutter blade and drive the studs into the pile. The hammer 68 is actuated by means of a lever 70 pivotally mounted upon the frame of the stud-driving mechanism and engaged by a torsion spring bar 71, to the opposite end of which is secured an adjusting lever 72 which is fixed in adjusted position by means of a bolt 74 engaging a slotted sector 73 fixed to the frame, so that the torsion to which the spring bar 71 is subjected, and therewith the strength of the blow of the hammer, may be regulated. Elastic buffer washers 75 are mounted on the hammer 68 to prevent concussion between the hammer and the frame. The hammer is lifted by a cam 76 mounted upon the forward end of the main shaft 77 of the stud-driving mechanism, which engages a projection 78 upon the rear side of the hammer bar 68 and lifts the same, after which it passes from underneath the projection and the hammer is permitted to drop in timed relation to the movement of the feeding rolls and the cutter bar. The main shaft 77 is journaled in the frame of the stud-driving mechanism and carries a bevel gear 79 engaged by a bevel gear 80 revolubly mounted in a bearing 81 upon the frame of the stud-driving mechanism. A vertical shaft 82 journaled in the frame of the machine is splined to the gear 80 and is driven by bevel gears from the main shaft 3.

Each stud-driving mechanism is slidingly mounted in vertical guides 4 so that it may move up and down to conform to variations in the diameter or contour of the pile passing under it, and it is supported by a roller 86 resting on the pile near the point at which the studs are inserted.

Means are provided for locking the stud-driving mechanism in position at the time the hammer is driving the studs into the pile. These means comprise a clamping dog 87 pivotally mounted at 88 on the frame of the stud-driving mechanism, and actuated by a locking lever 89 moved in one direction by a spring-pressed plunger 90 to cause the holding dog to pinch against the guide 4, and moved in the opposite direction by a cam surface 91 on the cam disk 54 once during each rotation of the shaft 77, so as to permit the stud-driving mechanism to rise or fall during the feeding of the pile.

The invention is not limited to the form of stud-driving mechanism described, nor to the details of construction and operation of the illustrated embodiment of the invention, but may be embodied in many other forms broadly defined in the claims.

I claim—

1. A machine for studding piles, having, in combination, stud-driving mechanism, pile-carrying means, means for reciprocating the pile-carrying means to feed the pile in opposite directions, and pile-rotating devices acting automatically to rotate the pile a part of a revolution at the end of each reciprocation, substantially as described.

2. A machine for studding piles, having, in combination, stud-driving mechanism including a hammer, pile-carrying means, the stud-driving mechanism being normally supported by the pile, means for locking the stud-driving mechanism in position with relation to the pile, and connected mechanism for actuating said locking means and hammer in timed relation to each other acting to lock the stud-driving mechanism while the hammer is driving a stud, substantially as described.

3. A machine for studding piles, having, in combination, means for supplying wire, means for cutting the wire to form studs, means for driving the studs into the pile, means for supporting the pile, means for feeding the pile, and connections between the feeding and the driving mechanism whereby the pile is fed after each operation of the driving mechanism and automatically rotated at the end of each row of studs, substantially as described.

4. A machine for studding piles, having, in combination, stud driving mechanism, pile carrying means, and pile rotating means comprising a holding ring secured to the pile, a friction ring held from rotation and in frictional engagement with the holding ring, a pawl ring, and means for actuating the pawl ring to rotate the holding ring, substantially as described.

5. A machine for studding piles, having, in combination, stud driving mechanism, pile carrying means, pile rotating means comprising a holding ring secured to the pile, a friction ring held from rotation and in frictional engagement with the holding ring, and means for rotating the holding member, substantially as described.

6. A machine for studding piles, having, in combination, stud driving mechanism, pile carrying means, means for feeding the pile, pile rotating means comprising a holding ring secured to the pile, a friction ring held from rotation and in frictional engagement with the holding ring, and connections for automatically rotating the holding ring at the end of each row of studs, substantially as described.

In testimony whereof I affix my signature, in presence of two witnesses.

GEORGE D. COLEMAN.

Witnesses:
HORACE VAN EVEREN,
FARNUM F. DORSEY.